March 22, 1927.
P. A. TRAPP
JERK LINE CONNECTION
Filed April 29, 1926
1,622,070
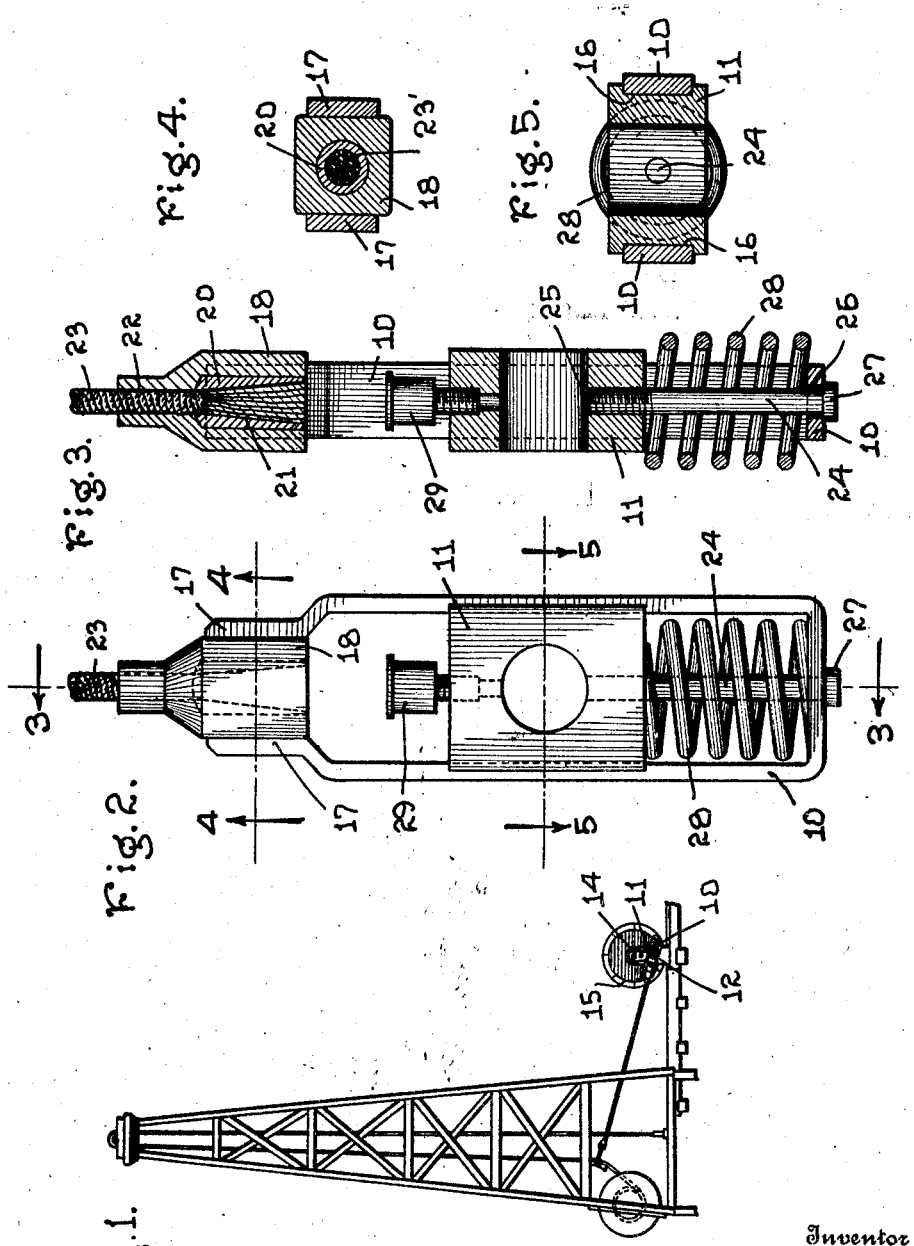
Inventor
PATRICK A. TRAPP
By
Attorney Patented Mar. 22, 1927.

1,622,070

UNITED STATES PATENT OFFICE.

PATRICK A. TRAPP, OF SHELBY, MONTANA.

JERK-LINE CONNECTION.

Application filed April 29, 1926. Serial No. 105,616.

The object of the invention is to provide a device for effecting connection between a jerk line and the wrist pin of the crank carried by the band wheel or drive pulley of a well drilling apparatus to absorb the jar and thus reduce the likelihood of damage or rupture of the spudding line, either through the sudden jerk caused by the tool failing to reach bottom when dropped or through buckling of the spudding line where it is attached to the tool; and to provide a simple and cheap device practically adapted to replace the double manila line ordinarily employed and whose elasticity is depended upon to relieve the jar.

With this object in view, the invention consists in a construction and combination of parts of which a preferred embodiment is illustrated in the accompanying drawings, wherein:

Figure 1 is a general view of a drilling apparatus showing the manner of employment of the invention.

Figure 2 is an enlarged detail elevational view of the invention.

Figure 3 is a longitudinal sectional view on the plane indicated by the line 3—3 of Figure 2.

Figures 4 and 5 are transverse sectional views respectively on the planes indicated by the lines 4—4 and 5—5 of Figure 2.

Primarily a shock absorber to cushion the jars resulting from the failure of the drill to hit bottom and to absorb the jar or shock as the slack of the spudding line is taken up when the drill is raised, the invention consists of a slide frame 10 in which is mounted a slide bearing 11 rotatably mounted on the wrist pin 12 of the crank 14 of the band wheel 15. The frame 10 is of open construction and sliding connection between it and the block 11 is provided by grooves 16 formed on opposite sides of the latter in which the side arms of the frame engage. At one end, the side arms of the frame are deflected inwardly, as indicated at 17, the deflected extremities being secured to a block 18 on opposite sides of the latter by welding them thereto or riveting them or employing any acceptable means of attachment.

The block 18 is counterbored from the inner end, as indicated at 19, and in this counterbore is seated a sleeve 20, the latter having a tapering bore 21, the larger end of which opens at the inner end of the block. This tapering bore is axially aligned with the bore 22 in the protruding extremity of the block. The terminal of the jerk line 23 is inserted through the bore 22 and lies in the tapering bore of the sleeve 20, those strands within the sleeve being untwisted to space them apart and permit the filler 23′, which is of a low melting point metal, to completely surround them and embed them so that the terminal of the jerk line is securely held in the sleeve and, the latter being loosely mounted in the bore of the block, a swivel connection is provided between the jerk line and the frame 10.

The slide bearing 11 has a limited movement longitudinally of the frame 10, its travel in the direction of the connected end of the jerk line being limited by a screw-stud 24 axially aligned with the bore 22 and threaded into the bearing block as at 25, the shank of the stud passing slidably through an eye 26 in the extremity of the frame and the head 27 of the stud abutting the outer face of said extremity. A compression spring 28 of spiral form and of sufficient strength is disposed in surrounding relation to the screw-stud and compressed between the bearing block and the extremity of the frame and yieldingly impels the bearing block toward that end of the frame with which the jerk line is connected, so that the force of raising the tool or cushioning a shock on the spudding line results in compression of the spring.

As a means for lubricating the wrist pin, a grease cup 29 is provided, being mounted in the bearing block in alignment with and diametrically opposite the screw-stud 24.

The invention having been described, what is claimed as new and useful is:

A device for the purpose indicated comprising an open frame, a wrist pin bearing block slidably mounted in the frame, means for connecting the terminal of a jerk line to the frame at one extremity, a limiting stop precluding movement of the bearing block beyond a certain point in the frame in the direction of the connected end of the jerk line, and a cushioning device acting in opposition to said limiting stop, the limiting stop consisting of a screw-stud slidably engaging the frame and having a fixed connection with the bearing block, and the cushioning device comprising a spiral spring in surrounding relation to the stud and compressed between the block and the extremity of the frame.

In testimony whereof he affixes his signature.

PATRICK A. TRAPP.